(12) United States Patent
Lee et al.

(10) Patent No.: US 10,045,005 B2
(45) Date of Patent: Aug. 7, 2018

(54) 3D CAMERA MODULE

(71) Applicant: LG ELECTRONICS INC., Seoul (KR)

(72) Inventors: Changhwan Lee, Seoul (KR); Gwanmo Koo, Seoul (KR); Youngwoo Park, Seoul (KR); Donghwa Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 15/102,836

(22) PCT Filed: Dec. 10, 2013

(86) PCT No.: PCT/KR2013/011403
§ 371 (c)(1),
(2) Date: Jun. 8, 2016

(87) PCT Pub. No.: WO2015/088057
PCT Pub. Date: Jun. 18, 2015

(65) Prior Publication Data
US 2016/0316189 A1   Oct. 27, 2016

(51) Int. Cl.
*G03B 5/02* (2006.01)
*G03B 9/08* (2006.01)
(Continued)

(52) U.S. Cl.
CPC ............. *H04N 13/021* (2013.01); *G03B 5/02* (2013.01); *G03B 9/08* (2013.01); *G03B 17/12* (2013.01);
(Continued)

(58) Field of Classification Search
CPC ............. H04N 13/021; H04N 13/0051; H04N 13/0289; G03B 5/02; G03B 9/08;
(Continued)

(56) References Cited

U.S. PATENT DOCUMENTS 5,835,133 A * 11/1998 Moreton ............ G02B 27/2264
348/49
6,922,285 B2 * 7/2005 Kobayashi ............ G03B 35/00
348/55

(Continued)

FOREIGN PATENT DOCUMENTS

JP            3253421 B2    2/2002
KR   10-2007-0101531 A    10/2007
(Continued)

*Primary Examiner* — Nicholas G Giles
(74) *Attorney, Agent, or Firm* — Birch, Stewart, Kolasch & Birch, LLP

(57) ABSTRACT

Provided is a 3D camera module, comprising: a first camera lens group for forming a light path of a first light bundle so as to be one of a left-eye lens group and a right-eye lens group in the 3D camera module; a second camera lens group, disposed apart from the first camera lens group, for forming a light path of a second light bundle so as to be the other of the left-eye lens group and the right-eye lens group in the 3D camera module; an image sensor disposed on the movement path of the first and second light bundles so as to sense a first image by the first light bundle and a second image by the second light bundle; and a movement control unit configured to move the first camera lens group and the second camera lens group in at least one direction of a forward and backward direction and a left and right direction so as to control the first and second images.

14 Claims, 8 Drawing Sheets

(51) Int. Cl.
*G03B 17/12* (2006.01)
*G03B 17/56* (2006.01)
*G03B 35/02* (2006.01)
*G03B 35/08* (2006.01)
*H04N 13/00* (2018.01)
*H04N 13/02* (2006.01)

(52) U.S. Cl.
CPC ........... *G03B 17/561* (2013.01); *G03B 35/02* (2013.01); *G03B 35/08* (2013.01); *H04N 13/0051* (2013.01); *H04N 13/0289* (2013.01); *H04N 2013/0096* (2013.01); *H04N 2213/001* (2013.01)

(58) Field of Classification Search
CPC ...... G03B 17/12; G03B 17/561; G03B 35/02; G03B 35/08
See application file for complete search history.

(56) References Cited

U.S. PATENT DOCUMENTS

| | | | |
|---|---|---|---|
| 6,999,125 B2* | 2/2006 | Fujiwara | H04N 13/021 348/362 |
| 9,348,211 B2* | 5/2016 | Tsai | H04N 13/021 |
| 2001/0004298 A1* | 6/2001 | Kobayashi | G03B 35/00 359/462 |
| 2009/0058992 A1 | 3/2009 | Jung et al. | |
| 2010/0231691 A1 | 9/2010 | Lee | |
| 2013/0057732 A1* | 3/2013 | Uemura | H04N 13/0217 348/240.3 |
| 2013/0093858 A1* | 4/2013 | Lee | G02B 27/283 348/49 |
| 2013/0127997 A1* | 5/2013 | Inomoto | H04N 13/02 348/46 |
| 2013/0242061 A1* | 9/2013 | Tsai | G03B 35/10 348/49 |
| 2013/0278731 A1* | 10/2013 | Inomoto | G03B 35/10 348/49 |
| 2015/0229910 A1* | 8/2015 | Lang | H04N 13/0239 348/47 |

FOREIGN PATENT DOCUMENTS

| KR | 10-2010-0093316 A | 8/2010 |
| KR | 10-2011-0034737 A | 4/2011 |
| KR | 10-2013-0052582 A | 5/2013 |

\* cited by examiner

3D CAMERA MODULE

CROSS REFERENCE TO RELATED APPLICATIONS

This application is the National Phase of PCT/KR2013/011403 filed on Dec. 10, 2013, which is hereby expressly incorporated by reference into the present application.

TECHNICAL FIELD

The present disclosure relates to a three-dimensional (3D) camera module, and more particularly, a camera module capable of capturing a left view image and a right view image in a simultaneous manner.

BACKGROUND ART

In recent years, as the interest in stereoscopic image services increases, devices for providing a stereoscopic image continue to be developed. Among the methods for implementing such a stereoscopic image, there is a stereoscopic method, a volumetric method, a holographic method.

The basic principle of a stereoscopic method relates to a scheme for providing images, which are disposed perpendicular to each other, to the left and right eyes of a viewer in a separate manner, and the visual cortex in the brain of the viewer may interpret such two images as being combined to form a three-dimensional or stereoscopic image. In this instance, the images arranged to be perpendicular to each other become a left view image and a right view image, respectively.

Recent 3D cameras are constructed to capture (photography, take) a left view image and a right view image simultaneously through one device. For example, the stereoscopic scheme using two cameras which are the same as each other is widely used. For the stereoscopic scheme, two cameras are arranged with a predetermined gap (baseline) so as to acquire left-view and right-view images using the two completely independent cameras (two lenses, two sensors, two ISPs).

However, the stereoscopic-type 3D camera causes a quality-related problem due to an assembly error between the two cameras, which results in lowering 3D quality and thereby requiring for a highly-precise assembly process and bringing about a yield loss. Also, a 3D depth measurement range is decided by the baseline as the gap between the two fixed cameras. In addition, for a 3D zoom-lens, even though the two cameras are initially well aligned with each other, an error between the two cameras is generated due to a zooming operation, which degrades image quality and thereby causes user's fatigue.

Therefore, a method and apparatus for effectively solving those problems in the 3D camera may be taken into account.

SUMMARY OF THE INVENTION

Therefore, to obviate those related art problems, an aspect of the detailed description is to provide a three-dimensional (3D) camera apparatus capable of realizing a high-quality stereoscopic image by correcting (calibrating) an error between two cameras.

Another aspect of the detailed description is to provide a method of reducing or preventing a crosstalk between a left view image and a right view image even during an execution of a zooming function in a 3D camera apparatus.

To achieve these and other advantages and in accordance with the purpose of the present invention, as embodied and broadly described herein, there is provided a three-dimensional camera module, including a first camera lens group forming a light path of a first light bundle so as to be one of a left-eye lens group and a right-eye lens group in the 3D camera module, a second camera lens group disposed apart from the first camera lens group, and forming a light path of a second light bundle so as to be the other of the left-eye lens group and the right-eye lens group in the 3D camera module, an image sensor disposed on movement paths of the first and second light bundles so as to sense a first image by the first light bundle and a second image by the second light bundle, and a movement control unit configured to move the first camera lens group and the second camera lens group in at least one direction of a forward and backward direction and a left and right direction so as to control the first and second images.

In one embodiment related to the present invention, the camera module may include a shutter unit disposed between the image sensor and both of the first camera lens group and the second camera lens group and allowing the first and second light bundles to be transmitted therethrough in a sequential manner.

The shutter unit may include a first part on which the first light bundle is incident, a second part on which the second light bundle is incident, and a driving unit configured to sequentially open and close the first part and the second part. The first part and the second part may be disposed in parallel to each other on the same plane. The driving unit may control an opening/closing time of each of the first and second parts to match brightness of the first image with brightness of the second image on the image sensor. The driving unit and the image sensor may be synchronized with each other to acquire a left view image and a right view image.

In another embodiment related to the present invention, a prism for refracting the first light bundle and the second light bundle in different directions may be disposed between both of the first camera lens group and the second camera lens group and the image sensor. The first camera lens group and the second camera lens group may be disposed in parallel to each other. The prism may be configured as a variable type such that the first light bundle and the second light bundle are incident even when a distance between the first camera lens group and the second camera lens group changes.

In another embodiment related to the present invention, a mirror unit for reflecting the first light bundle and the second light bundle in different directions may be disposed between both of the first camera lens group and the second camera lens group and the image sensor.

The mirror unit may include a first mirror reflecting the first light bundle, a second mirror reflecting the second light bundle, and a middle mirror disposed between the first and second mirrors and reflecting each of the first and second light bundles. At least one of the first mirror, the second mirror and the middle mirror may be tiltable to change a reflecting angle.

In another embodiment related to the present invention, the camera module may further include first and second housings in which the first camera lens group and the second camera lens group are mounted, respectively, and the movement control unit may move the first and second housings in a forward and backward direction.

The movement control unit may move the first and second housings in a left and right direction to constantly maintain disparity between the first and second images during an execution of a zooming function. The first and second housings may be moved along a rotation trajectory to calibrate disparity between the first and second images during an execution of a zooming function. The first and second housings may be connected to each other by a link such that the second housing is moved in response to a movement of the first housing.

In another embodiment related to the present invention, a 2D camera function may be executed by using a control that one of the first camera lens group and the second camera lens group is driven and the other is not driven.

Advantageous Effect

In accordance with the detailed description, disparity caused due to a zooming function can be calibrated in a manner of moving a camera in a forward and backward direction and a left and right direction. Also, in the present invention, optical paths can be changed, in response to a movement of camera housings in the left and right direction, by use of a variable prism or a tiltable mirror.

Also, the present invention can generate a stereoscopic image without a crosstalk in a manner of synchronizing a shutter unit with an image sensor and splitting images. This may result in realizing a 3D zooming function.

In addition, the present invention can reduce a size and a cost of a camera module by virtue of non-use of a separate configuration for 2D compatibility, unlike the related art.

DETAILED DESCRIPTION OF THE EMBODIMENTS

Figure 1:
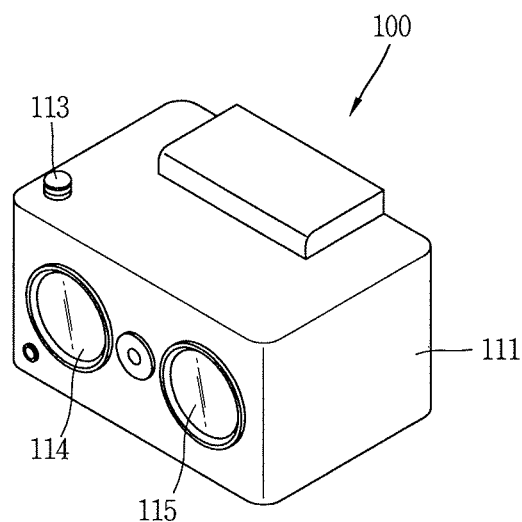
FIG. 1 is a perspective view illustrating appearance of a 3D camera in accordance with the present invention.

The term 3-D or 3D may be used to describe a visual output or display technology for reproducing three-dimensional images that have the optical illusion of depth perception. With respect to an image for the left eye and an image for the right eye, the visual cortex in the brain of the viewer may interpret such two images as being combined to form a three-dimensional image.

A three-dimensional (3D) display technology employs 3D image processing and expression techniques for a device capable of displaying 3D images. The device capable of displaying 3D images may additionally use a special viewing device in order to provide a 3-dimensional image viewing effect to the viewer.

Examples of the 3D image processing and rendering include stereoscopic image/video capture, multiview image/video capture using a plurality of cameras, processing of 2D image and depth information and the like. Examples of devices capable of 3D image display may include a liquid crystal display (LCD) provided with suitable hardware and/or software supporting 3D display technologies, a digital TV screen, a computer monitor, and the like. Examples of the special viewing device may include specialized glasses, goggles, head gear, eyewear, and the like.

In detail, examples of 3D image display technologies include anaglyph stereoscopic image display technology (typically used together with passive anaglyph glasses), polarized stereoscopic image display technology (typically used together with passive polarized glasses), alternate-frame sequential display technology (typically used together with active shutter glasses/head gear), auto-stereoscopic display technology using a lenticular or barrier screen, and the like. The various concepts and features described hereafter may be applicable to such 3D image display technologies.

One type of 3D image display technology may employ a segmented polarizer adhered to a rotating or alternately operating optical device, for example, a color filter wheel, which requires synchronization with each other. Another type of 3D image display technology may employ a digital light processor (DLP) based on a digital micromirror device (DMD) using rotatable microscopic mirrors disposed in an array arrangement corresponding to the pixels to be displayed.

New types of standards associated with rendering and display technologies (particularly, 3D-TV) for a stereoscopic image are being currently developed by various companies, consortiums, and organizations, and the examples thereof may include SMPTE (the Society of Motion Picture and Television Engineers), CEA (Consumer Electronics Association), 3D@Home consortium, ITU (International Telecommunication Union), and the like. In addition, other standardization groups such as DVB, BDA, ARIB, ATSC, DVD Forum, IEC, and the like, participate therein. MPEG (Moving Picture Experts Group) participates in 3D image coding of multiview images, stereoscopic images, and two-dimensional images having depth information, and multiview video codec extension for MPEG-4 AVC (Advanced Video Coding) is being standardized. Stereoscopic image coding and stereoscopic distribution formatting are related to color shifting (anaglyph), pixel sub-sampling (side-by-side), checkerboard, quincunx, and enhanced video coding (2D+delta, 2D+metadata, and 2D having depth information). The concepts and features described hereafter may be applicable to any of the above-mentioned standards.

Furthermore, at least part of the concepts and features disclosed herein may be related to 3D image display technologies described with respect to image display environments for digital images or 3D TV implementations. However, the detailed description does not limit various features described herein, and may be applicable to other types of display technologies and devices. For example, 3D TV technologies may be applicable to Blu-ray™ devices, console games, cable and IPTV transmission systems, mobile terminal contents transfer protocols, and the like, and in this case they should be compatible to other types of TVs, set top boxes, Blu-ray™ devices (for example, Blu-ray™ Disk (BD) players), DVD players, and TV contents distributors.

Considering back the 3D image processing and rendering method, the stereoscopic image/video capture is referred to as a stereo imaging method considering two viewpoints, and the multiview image/video capture using the plurality of cameras is referred to as a multiview imaging method considering three or more viewpoints.

The stereo imaging method uses a pair of left and right view images obtained by capturing the same subject using a left camera and a right camera, which are spaced apart from each other by a predetermined distance. The multiview imaging method uses three or more images obtained by capturing the same subject using three or more cameras which have predetermined distances or angles from one another. For the multiview imaging method, two of those images are designated as a left view image and a right view image, thereby realizing a stereoscopic image.

The present invention proposes a method of implementing a high-quality stereoscopic image (video) in a 3D camera module capable of capturing a pair of left and right view images. Hereinafter, the 3D camera module according to the present invention will be described in more detail with reference to the accompanying drawings. For the sake of brief description with reference to the drawings, the same or equivalent components may be provided with the same or similar reference numbers, and description thereof will not be repeated.

A singular representation may include a plural representation unless it represents a definitely different meaning from the context.

The 3D camera module described herein may be mounted not only in an individual camera device, but also in a projector, a mobile terminal, a laptop computer, a personal digital assistant (PDA), a portable multimedia player (PMP), a navigator, and the like.

FIG. 1 is a perspective view illustrating appearance of a 3D camera in accordance with the present invention.

It is understood that implementing all of components illustrated in FIG. 1 is not a requirement, and that a 3D camera module 100 having greater or fewer components may alternatively be implemented.

The appearance of the 3D camera module 100 is defined by a case 111. Various optical components and electronic components are mounted in a space formed by the case 111.

A manipulation unit 113 may be disposed in the case 111. The manipulation unit 113 may employ any tactile manner if the user is able to manipulate with tactile feeling.

The manipulation unit 113 allows the user to input a command for controlling an operation of the 3D camera module 100. From the structural perspective, the manipulation unit 113 may be used for inputting menus, such as start, end, and the like.

Also, the manipulation unit 113 may be manipulated for zooming in or out an image projected through the 3D camera module 100. The manipulation unit 113 may be manipulated for focusing on an image projected through the image projector 100.

A front surface of the 3D camera module 100 is provided with incident surfaces of a first camera 114 and a second camera 115. The first camera 114 and the second camera 115 are disposed with a predetermined interval and acquire left and right view images, respectively. To this end, the 3D camera module 100 is equipped with an optical system for capturing a stereoscopic image.

The optical system refers to a system of optical components that a reflector, a lens and the like are properly arranged to render an image of an object by using reflection or refraction of light. A structure (not illustrated) with which the optical system is to be assembled may additionally be disposed between the optical system and a lower case. Hereinafter, the optical system according to the present invention will be described in more detail.

Figure 2:
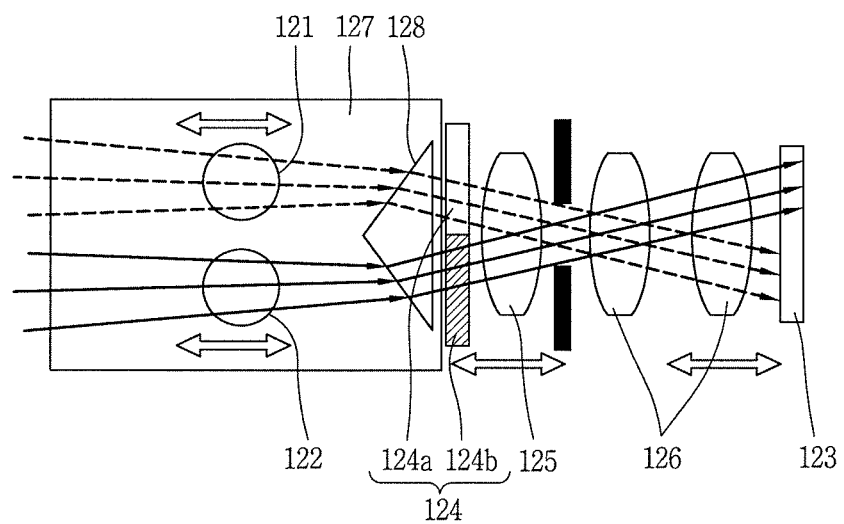
FIG. 2 is a conceptual view illustrating an optical system in accordance with one exemplary embodiment of the present invention.
Figure 3:
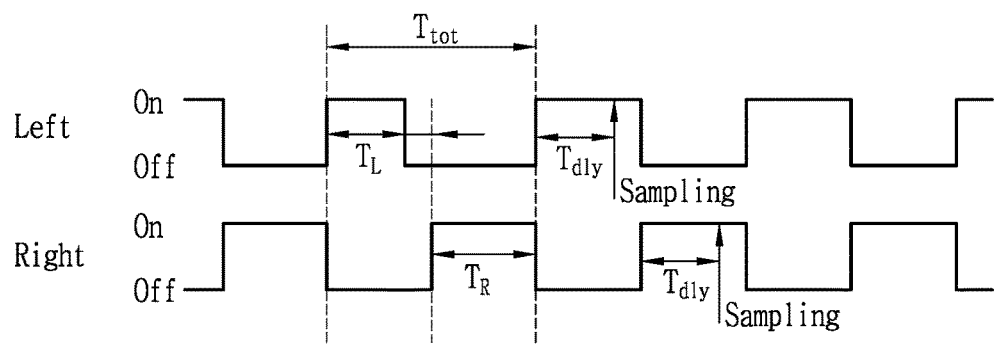
FIG. 3 is a conceptual view illustrating an operating method of a shutter unit according to the present invention.

FIG. 2 is a conceptual view illustrating an optical system in accordance with one exemplary embodiment of the present invention, and FIG. 3 is a conceptual view illustrating an operating method of a shutter unit according to the present invention.

As illustrated in FIGS. 2 and 3, the 3D camera module 100 includes a first camera lens group 121, a second camera lens group 122, and an image sensor 123.

The first camera lens group 121 forms a light path of a first light bundle to be one of a left eye lens group and a right eye lens group in the 3D camera module. The lens bundle refers to an assembly of lenses which are disposed with predetermined intervals to perform one optical function.

Also, the second camera lens group 121 is spaced apart from the first camera lens group 121 and forms a light path of a second light bundle to be the other of the left eye lens group and the right eye lens group in the 3D camera module. The first camera lens group 121 and the second camera lens group 122 are disposed in parallel to each other, to implement disparity of a stereoscopic image.

The image sensor 123 is disposed on movement paths of the first and second light bundles to sense a first image by the first light bundle and a second image by the second light bundle.

The image sensor 123 may be implemented in a form that a semiconductor chip is mounted on a sensor substrate. The semiconductor chip may implemented by a charge-coupled device (CCD) which obtains an image by converting light into electric charge, a complementary metal oxide semiconductor (CMOS), or the like.

The image sensor 123 is provided in a singular form, but capable of sensing both of the first image and the second image. Here, one of the first image and the second image may be a left eye image and the other may be a right eye image.

A shutter unit 124, a zoom lens group 125, a focus lens group 126 and the like may be disposed between the image sensor 123 and the first camera lens group 121.

The shutter unit 124 is disposed between both of the first camera lens group 121 and the second camera lens group 122 and the image sensor 123, to sequentially transmit the first and second light bundles therethrough.

The zoom lens group 125 is a lens group which is movable back and forth and performs a zooming function. The focus lens group 126 is a lens group performing a focusing function. Each of the lens groups may be configured such that lenses thereof have adjustable intervals therebetween for zooming or focusing.

Because of the use of the single image sensor, in order to prevent a generation of a crosstalk between the left and right view images during an execution of a zooming function, a left/right switching 3D shutter is disposed between the camera lens groups and the zoom lens group 125. The shutter unit 124 may be omitted in case where the crosstalk is not present, and may be a mechanical shutter, a liquid crystal shutter and the like.

In more detail, the shutter unit 124 includes a first part 124*a*, a second part 124*b*, and a driving unit (not illustrated).

The first part 124*a* may be a portion on which the first light bundle is incident, and the second part 124*b* may be a portion on which the second light bundle is incident. As illustrated, the first part 124a and the second part 124b may be disposed on the same plane to be in parallel to each other and configured such that one is closed when the other is open.

The driving unit (not illustrated) sequentially opens and closes the first part 124a and the second part 124b. To acquire a left view image and a right view image, the driving unit and the image sensor 123 are synchronized with each other. That is, to acquire a left view image and a right view image on a sensor in response to a left/right opening/closing of the 3D shutter, the image sensor and the 3D shutter are synchronized with each other.

In this manner, the present invention is characterized by employing an optical shielding structure in a middle of the optical system for preventing the crosstalk and flare of the camera lens groups.

In addition, the driving unit controls an opening/closing time of each of the first and second parts 124a and 124b to match brightness of the first image with brightness of the second image on the image sensor.

The shutter unit 124 has the structure that left and right sides thereof (i.e., the first and second parts) are alternately open and closed. Accordingly, images of the both sides are formed on the image sensor in an alternating manner by applying opposite signals to left and right driving circuits.

For example, the shutter unit 124 is driven under assumption that TL+TR+a=Frame rate−1. Brightnesses of left and right view images are compared and TL and TR lengths are adjusted to receive the images with the same brightness. In this instance, a shutter-on time of a brighter side of the left and right parts is reduced by a, such that the images continuously have the same brightness. Also, the driving unit is configured in a manner of TL, TR>Tdly, to be synchronized with the image sensor, such that the images can be sampled when the images are sufficiently reflected on the image sensor.

Referring back to FIG. 2, the 3D camera module 100 may perform a 2D camera function by use of a control that one of the first camera lens group 121 and the second camera lens group 122 is driven and the other is not driven.

The first camera lens group 121 and the second camera lens group 122 may become 3D-compatible lenses. In order to enable 2D/3D compatibility by an individual camera operation without a 3D-compatible lens, a one group lens is needed. For example, in a scheme of replacing a 3D-compatible lens with a 2D lens group, the one group lens is required which extends a total length. However, in the present invention, the 2D camera enables the 2D/3D compatibility using one of left and right-eye lenses. That is, the function of the one group lens is integrated (unified) with a compatible lens group so as to reduce an optical total length, and also the one group lens can be completely removed or partially reduced so as to provide the camera apparatus in a more compact size.

As illustrated, the optical system includes a movement control unit 127. The movement control unit 127 controls the first camera lens group 121 and the second camera lens group 122 to be moved in at least one of a forward and backward direction and a left and right direction, in order to adjust the first and second images. In more detail, the first camera lens group 121 and the second camera lens group 122 of the compatible lens group have a mechanism of independently adjusting the left and right lenses to calibrate distorted focuses of the left and right lenses.

Also, a prism 128 that refracts the first light bundle and the second light bundle into different directions is disposed between the image sensor and both of the first camera lens group 121 and the second camera lens group 122. That is, the prism 128 executes a function of splitting left and right-view images.

The left/right-view image splitting prism 128, as illustrated, may be a fixed prism made of plastic or glass. However, the present invention may not be limited to this. For example, a liquid crystal variable prism may be used to adjust a tilt of the prism to left or right.

With the structure of the optical system described above, a camera module capable of generating a stereoscopic image without a crosstalk can be implemented. Also, the camera module according to the present invention can be embodied into various shapes or forms. Hereinafter, different exemplary embodiments of the camera module according to the present invention will be described in more detail.

Figure 4:
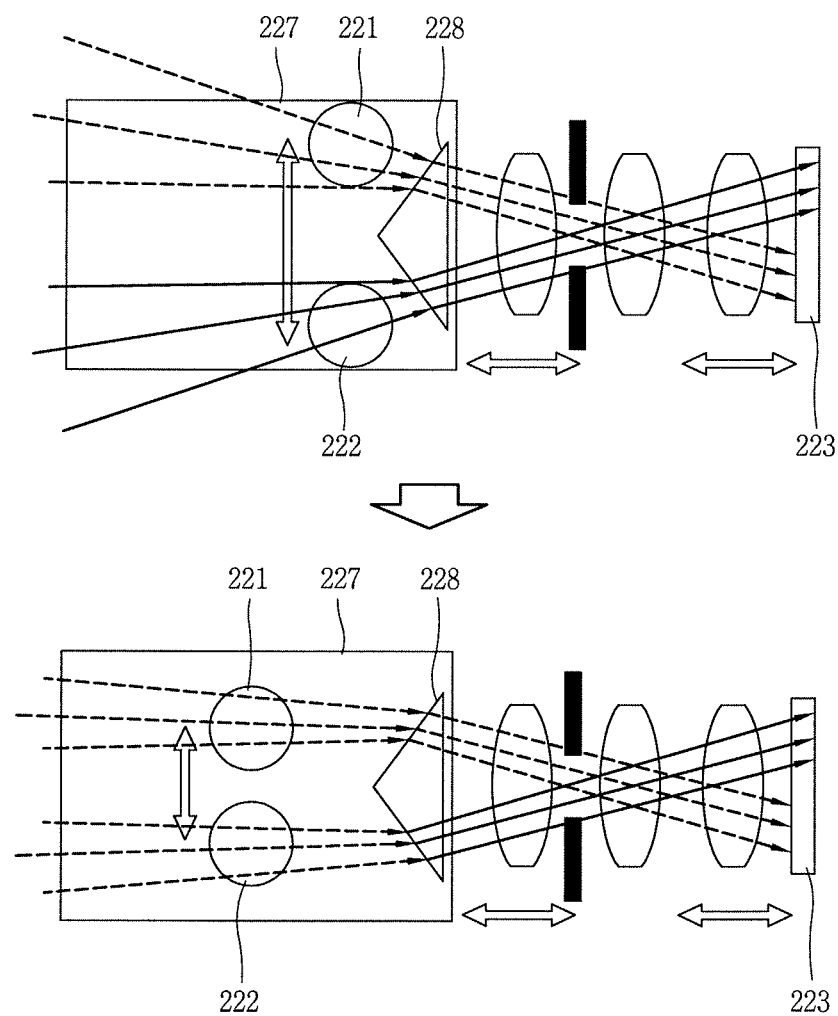
FIG. 4 is an operation view illustrating a left and right movement in an optical system in accordance with another exemplary embodiment of the present invention.

FIG. 4 is an operation view illustrating a movement in a left and right direction in an optical system in accordance with another exemplary embodiment of the present invention.

As illustrated in FIG. 4, a movement control unit 227 moves a first camera lens group 221 and a second camera lens group 222 in a left and right direction to adjust first and second images that are sensed by a camera module. An image sensor 223 is also shown in FIG. 4.

A basic configuration of an optical system according to this exemplary embodiment is the same as the foregoing embodiment, with the biggest difference in that a 3D image corresponding to a wide range from a short distance to a remote distance can be rendered by varying a baseline. Here, the baseline refers to a distance between the first camera lens group 121 and the second camera lens group 122 that are in parallel to each other.

As a detailed exemplary application, first, a prism 228 may be configured as a variable type such that the first light bundle and the second light bundle are incident irrespective of a change in a distance between the first camera lens group 221 and the second camera lens group 222. As illustrated, by using an angle change of a variable-type beam-splitting prism, light or beam incident on a lens can be received according to the change in the variable baseline.

Also, the first camera lens group 221 and the second camera lens group 222 belonging to the compatible lens group for the change of the baseline may be allowed to be movable both in the left and right direction and in an optical axial direction (forward and backward direction).

The movement degree of the first camera lens group 121 and the second camera lens group 122 in the left and right direction may be linked with a distance up to an object (i.e., object distance) and a zooming function. In general, when an object is located at a short distance or a zooming magnification increases, disparity excessively increases. This makes the user feel inconvenient. The conventional fixed baseline method has no solution for the problem. On the other hand, according to the present invention, the disparity which varies according to the object distance and the zooming position can be calibrated by an active control of moving lens groups to right or left, thereby reducing user's fatigue.

The change of the baseline may be enabled by applying a variable compatible lens group to a front side of a fixed lens, as well as a zoom lens of two to four lens groups. Also, the variable compatible lens group can be applied to the conventional fixed stereo camera to change the baseline.

A typical 2D zoom lens includes individual motors which are independently driven for zooming and focusing operations. Also, a stereo-type 3D lens uses two zooming motors and two focusing motors which are driven to control zooming and focusing operations, respectively, and simultaneously synchronized with each other.

However, in this exemplary embodiment, a zoom lens group and a focusing lens group of a main lens are controlled by use of a single motor, without using separate motors as configured in the related art. In this instance, a non-linear cam locus uses a cam barrel. Also, in this instance, an object distance and a distorted focus between left and right lenses may be synchronized by a separate control using focusing motors which are provided at left and right sides of the lenses of the front compatible lens group, respectively.

Figure 5A:
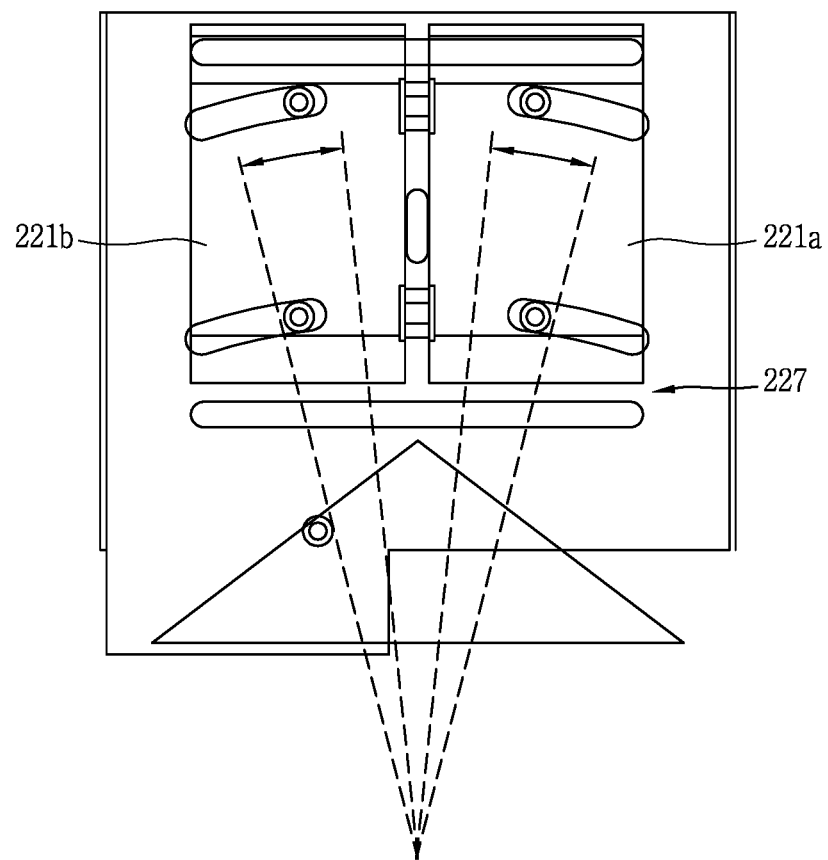
FIGS. 5A and 5B are views illustrating a configuration for implementing the operation of FIG. 4.
Figure 5B:
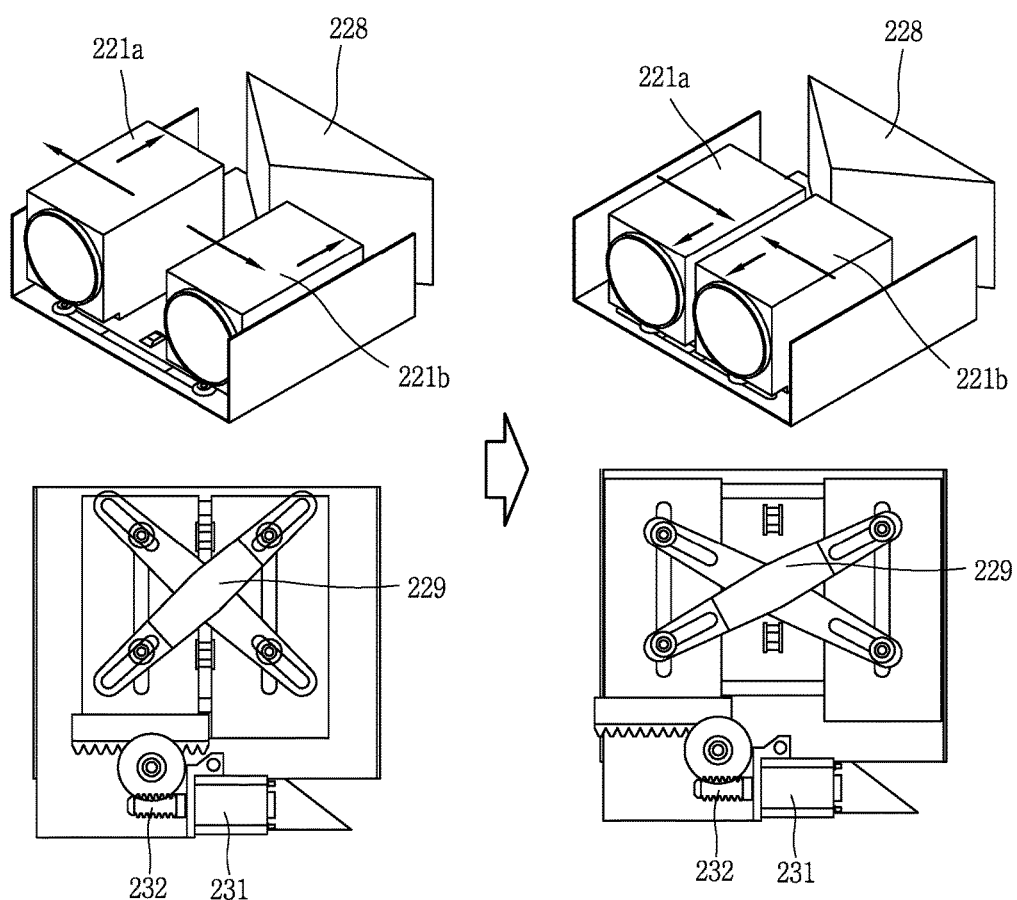
Figure 6A:
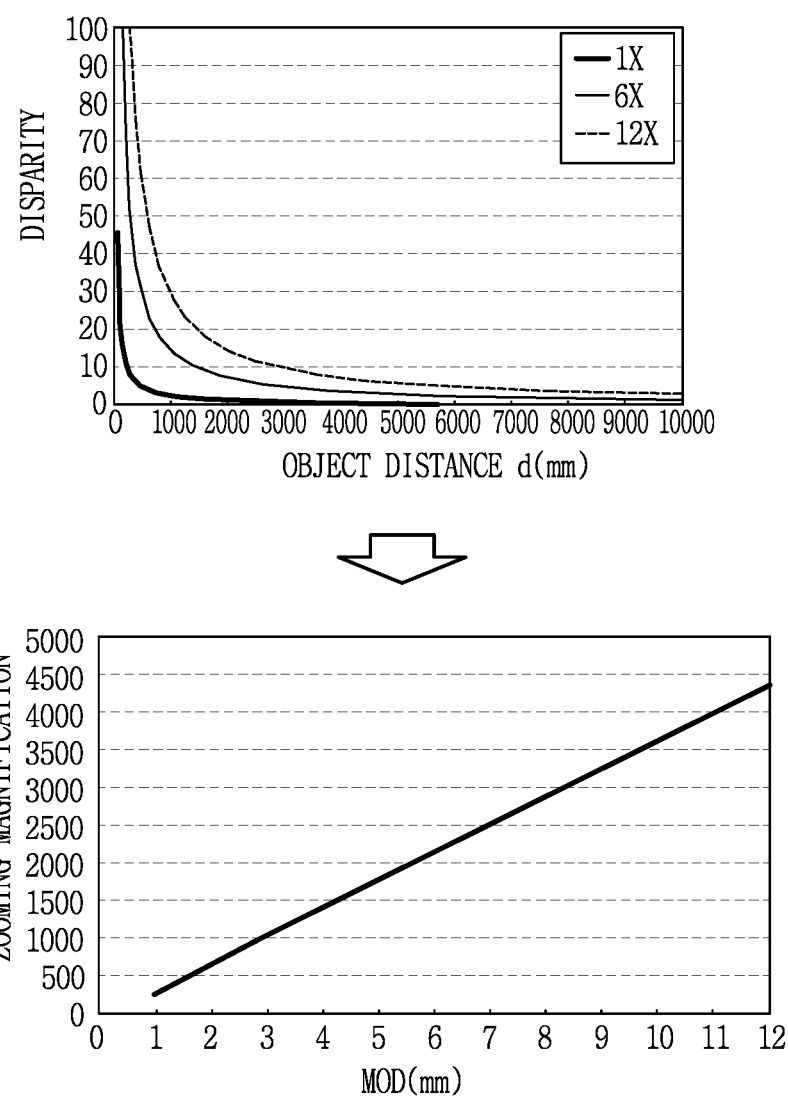
FIGS. 6A and 6B are graphs illustrating an object distance and disparity.
Figure 6B:
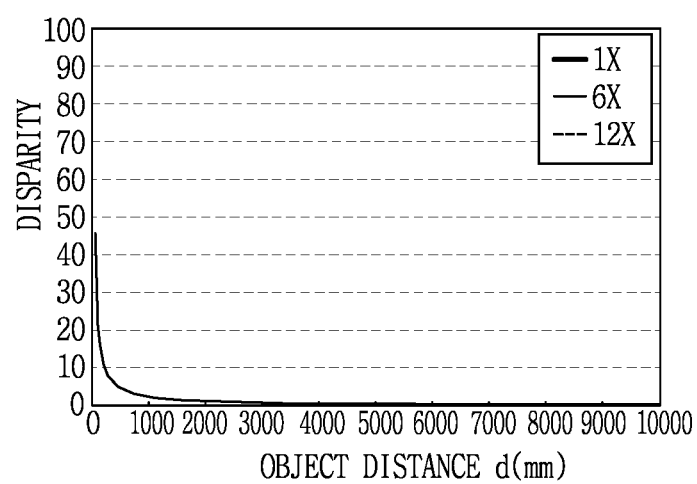
Figure 6B:
Figure 6B:
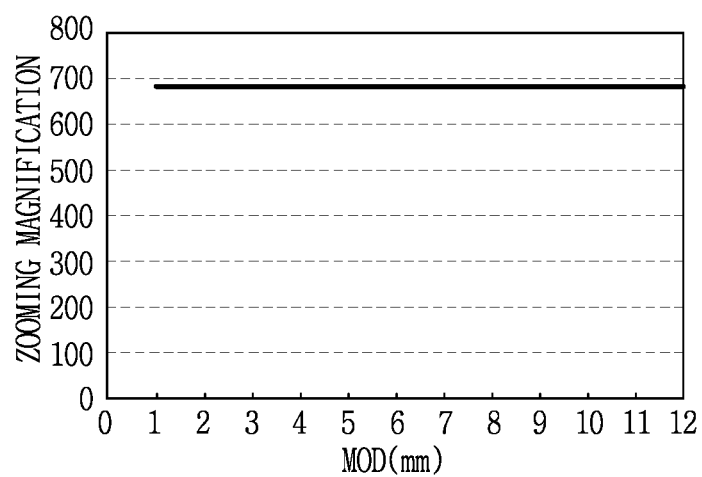

FIGS. 5A and 5B are views illustrating a configuration for implementing the operation of FIG. 4, and FIGS. 6A and 6B are graphs illustrating an object distance and disparity.

As illustrated, the first camera lens group and the second camera lens group are mounted in a first housing 221a and a second housing 221b, respectively. The movement control unit 227 is configured to move the first and second housings 221a and 221b in a forward and backward direction.

The movement control unit 227 also moves the first and second housings 221a and 221b in a left and right direction to constantly maintain the disparity between the first and second images during an execution of a zooming function. The first and second housings 221a and 221b may be moved along a rotation trajectory to calibrate the disparity between the first and second images during the execution of the zooming function. To implement the rotation trajectory, the second housing 221b is moved in response to the movement of the first housing 221a. For example, the first and second housings 221a and 221b may be connected to each other by a link 229. The link 229, for example, may be an X-link which includes a plurality of links formed in a shape like 'X'.

As a more detailed example, referring to FIGS. 5A and 5B, when a current is applied to a driver IC in response to an input of a control signal, a motor 231 is rotated and accordingly a gear train 232 is driven. The gear train 232 is connected to one of the first and second housings 221a and 221b, such that a driving force thereof can be transferred to the one housing in response to the rotation of the motor 231. In this instance, when a lens group is moved, an opposite lens group may be symmetrically moved through the X-link connected thereto, thereby changing the baseline.

However, if the lens groups are merely moved in the left and right direction, a problem that an image is blurred may be caused. Therefore, a slot which allows the lens groups to be movable even in the forward and backward direction when the baseline is changed may be provided such that the shortest distance between a center of the second lens group and a center of a left/right lens can always be constant, and the rotation trajectory is set accordingly. With the structure, the disparity which changes according to the object distance and the zooming position can actively be calibrated, thereby reducing the user's fatigue.

FIG. 6A illustrates exemplary object distance and disparity in a camera with a fixed baseline. Since the disparity increases in response to an increase in a zooming magnification, a recognizable minimum object distance (MOD) increases. On the other hand, FIG. 6B illustrates exemplary object distance and disparity in a camera with a variable baseline. According to the graph, it can be understood that the baseline is adjusted such that the disparity is constant at the same object distance, without an increase, in response to the zooming a lens. In this instance, the minimum object distance (MOD) is constant irrespective of the zooming magnification.

Hereinafter, optical systems according to different exemplary embodiments of the present invention will be described with reference to FIGS. 7 to 9.

Figure 7:
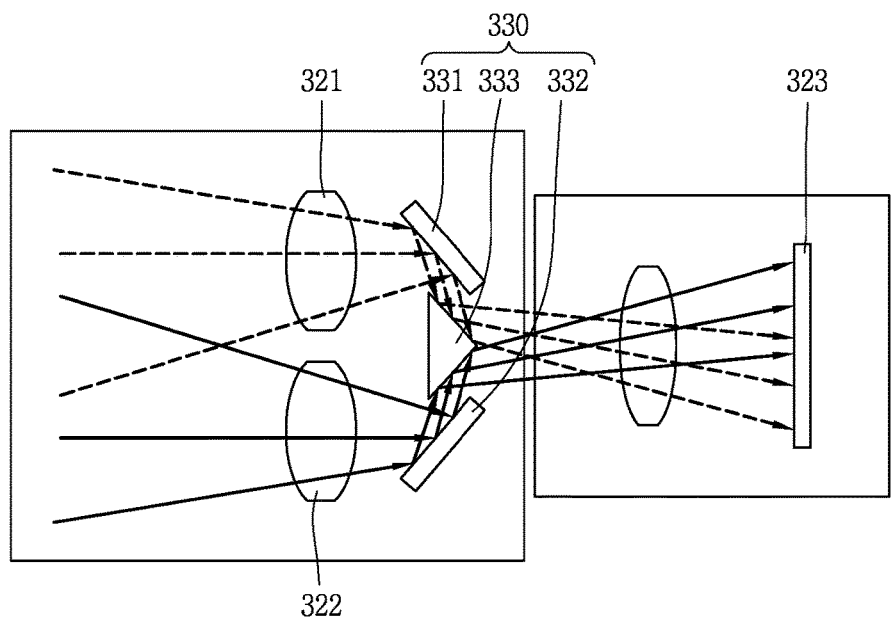
FIG. 7 is a conceptual view illustrating an optical system in accordance with another exemplary embodiment of the present invention.
Figure 8:
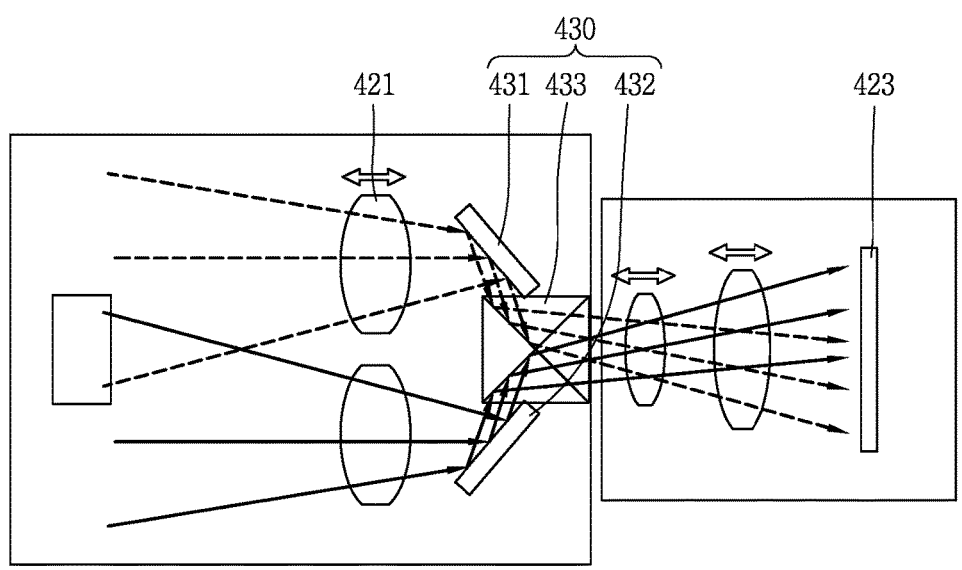
FIG. 8 is a conceptual view illustrating an optical system in accordance with another exemplary embodiment of the present invention.

FIGS. 7 and 8 are conceptual views illustrating optical systems in accordance with different embodiments of the present invention.

As illustrated in FIGS. 7 and 8, in replacement for the prism described in the foregoing embodiment, a mirror unit 330 for reflecting a first light bundle and a second light bundle in different directions is disposed between an image sensor 323 and both of a first camera lens group 321 and a second camera lens group 322.

Referring to FIG. 7, similar to a variable prism, an angle of a mirror is changed by a variable mirror, and a baseline may vary in response to a movement of lenses of a compatible lens group. In this instance, both of a zoom lens and a fixed lens are available as a main lens.

In more detail, the mirror unit 330 includes a first mirror 331, a second mirror 332, and a middle mirror 333.

The first mirror 331 may be a mirror reflecting the first light bundle, and the second mirror 332 may be a mirror reflecting the second light bundle. Also, the middle mirror 333 may be a mirror which is interposed between the first and second mirrors 331 and 332 to reflect each of the first and second light bundles.

At least one of the first mirror, the second mirror and the middle mirror may be tiltable to change a reflecting angle. In this exemplary embodiment, the first and second mirrors are configured to be tiltable so as to change light paths in cooperation with the change of the baseline.

Referring to FIG. 8, in this exemplary embodiment, first and second mirrors 431 and 432 are equally employed but a middle mirror may be replaced with an X-prism 433. In this instance, left and right compatible lenses should have different ranges of wavelengths received therethrough for splitting left and right view images. For example, when one of the left and right compatible lenses uses a visible-ray wavelength and the other uses an IR wavelength, the X-prism may split the rays or beams, thereby providing the same effect as illustrated in the embodiment of FIG. 7. As such, upon using the X-prism, the baseline may become shorter. Also, a more simplified structure can be realized by deleting or removing lenses of the compatible lens group, and in this instance, a keystone of an image can be calibrated through image calibration. An image sensor 423 is also shown in FIG. 8.

So far, various embodiments have been described to explain unique conceptions related to many aspects of the present invention. However, one or more detailed features described in one specific embodiment may be applicable to one or more other embodiments. Some components or steps described in each embodiment and related drawings may be modified, and additional components and/or steps may be deleted, moved or included.

The invention claimed is:

1. A three-dimensional (3D) camera module, comprising:
 a first camera lens group forming a light path of a first light bundle so as to be one of a left-eye lens group and a right-eye lens group in the 3D camera module;
 a second camera lens group disposed apart from the first camera lens group, and forming a light path of a second light bundle so as to be the other of the left-eye lens group and the right-eye lens group in the 3D camera module;

an image sensor disposed on movement paths of the first and second light bundles so as to sense a first image by the first light bundle and a second image by the second light bundle;

a movement control unit holding the first camera lens group and the second camera lens group and configured to move the first camera lens group and the second camera lens group in at least one direction of a forward and backward direction and a left and right direction so as to control the first and second images; and a prism for refracting the first light bundle and the second light bundle in different directions and disposed between both of the first camera lens group and the second camera lens group and the image sensor, wherein the first camera lens group and the second camera lens group are disposed in parallel to each other, and wherein the prism is configured as a variable type such that the first light bundle and the second light bundle are incident even when a distance between the first camera lens group and the second camera lens group changes.

2. The camera module of claim 1, further comprising a shutter unit disposed between the image sensor and both of the first camera lens group and the second camera lens group and allowing the first and second light bundles to be transmitted therethrough in a sequential manner.

3. The camera module of claim 2, wherein the shutter unit comprises:
   a first part on which the first light bundle is incident;
   a second part on which the second light bundle is incident; and
   a driving unit configured to sequentially open and close the first part and the second part.

4. The camera module of claim 3, wherein the first part and the second part are disposed in parallel to each other on the same plane.

5. The camera module of claim 3, wherein the driving unit controls an opening/closing time of each of the first and second parts to match brightness of the first image with brightness of the second image on the image sensor.

6. The camera module of claim 3, wherein the driving unit and the image sensor are synchronized with each other to acquire a left view image and a right view image.

7. The camera module of claim 1, wherein a mirror unit for reflecting the first light bundle and the second light bundle in different directions is disposed between both of the first camera lens group and the second camera lens group and the image sensor.

8. The camera module of claim 7, wherein the mirror unit comprises:
   a first mirror reflecting the first light bundle;
   a second mirror reflecting the second light bundle; and
   a middle mirror disposed between the first and second mirrors and reflecting each of the first and second light bundles.

9. The camera module of claim 8, wherein at least one of the first mirror, the second mirror and the middle mirror is tiltable to change a reflecting angle.

10. The camera module of claim 1, further comprising first and second housings in which the first camera lens group and the second camera lens group are mounted, respectively,
   wherein the movement control unit moves the first and second housings in a forward and backward direction.

11. The camera module of claim 10, wherein the movement control unit moves the first and second housings in a left and right direction to constantly maintain disparity between the first and second images during an execution of a zooming function.

12. The camera module of claim 10, wherein the first and second housings are moved along a rotation trajectory to calibrate disparity between the first and second images during an execution of a zooming function.

13. The camera module of claim 10, wherein the first and second housings are connected to each other by a link such that the second housing is moved in response to a movement of the first housing.

14. The camera module of claim 1, further comprising:
   a controller configured to execute a 2D camera function by driving only one of the first camera lens group and the second camera lens group.

* * * * *